March 11, 1930.  H. M. PURSEL  1,750,126
POWER OPERATED SCRAPER
Filed March 30, 1929
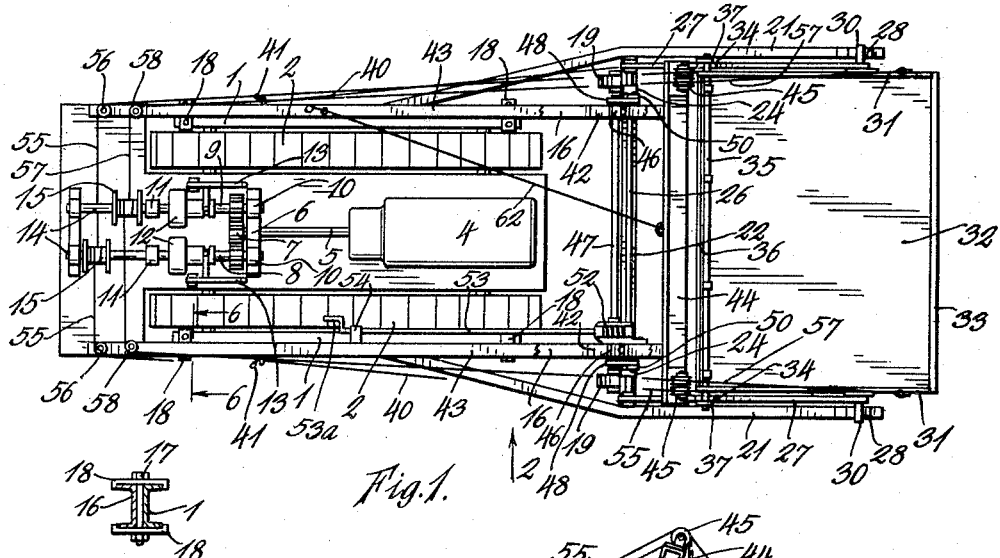
Fig. 1.
Fig. 6.
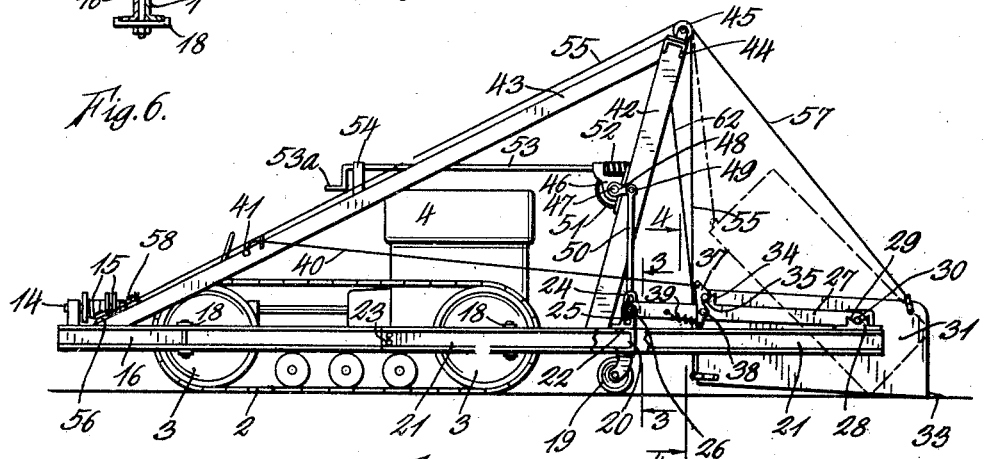
Fig. 2.
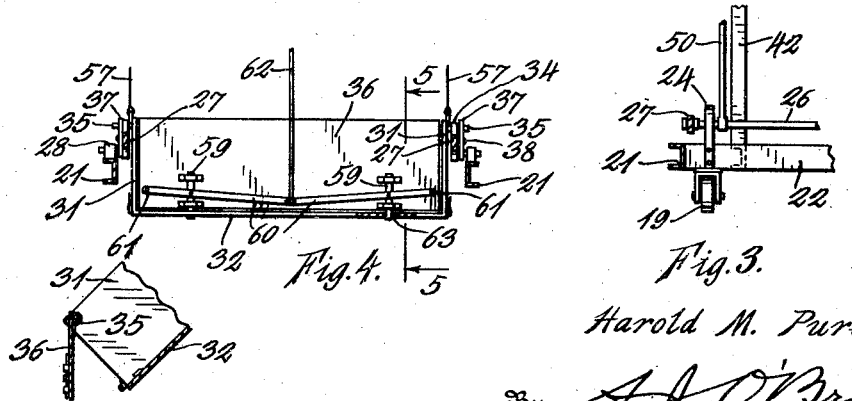
Fig. 4.
Fig. 3.
Fig. 5.
Inventor
Harold M. Pursel.
By A. J. O'Brien
Attorney Patented Mar. 11, 1930

1,750,126

UNITED STATES PATENT OFFICE

HAROLD M. PURSEL, OF CASPER, WYOMING, ASSIGNOR TO SHARROCK AND PURSEL, OF CASPER, WYOMING, A COPARTNERSHIP OF W. G. SHARROCK AND HAROLD M. PURSEL

POWER-OPERATED SCRAPER

Application filed March 30, 1929. Serial No. 351,138.

This invention relates to improvements in road making machinery and has reference more particularly to a power operated scraper employing as the motive power a caterpillar tractor of the usual type. In the construction of roads, as well as in many other places, it is often necessary to be able to dump the dirt or other material over the edge of an embankment or into a depression and for this purpose the usual construction of power operated scraper is inadapted as the front end of the frame is provided with caster wheels located to the front of the scraper and the parts are of such weight that if these front wheels project over an embankment, the tractor will be tilted forwardly and therefore such scrapers are not adapted for depositing dirt into depressions or over the sides of an embankment.

This invention, briefly described, consists of a caterpillar tractor or a tractor of ordinary four-wheel construction to which a frame is applied. This frame consists of two parallel side members one of which is attached to each of the sides of the tractor and projects forwardly beyond the front end of the tractor. Located between the front ends of the beams is a scraper. This scraper has a link pivotally connected to each side and these links extend rearwardly to a point to the rear of the scraper and are pivotally attached to the frame. Means is provided to support the scraper and links at a point near the front end of the beams and means is also provided for supporting the rear end of the scraper from the links. The scraper is so constructed that it can be tilted forwardly about the pivotal connection with the links without disturbing the position of the links relative to the frame, but it cannot be rotated in the opposite direction without also rotating the link with respect to the frame. The scraper is provided with a winch operated hoisting mechanism by means of which the scraper can be tilted forwardly or rearwardly as may be desired, so that the dirt can be readily discharged over an embankment or can be discharged on the surface directly in front of the tractor as may be desired.

Having thus briefly described the invention, the same will now be described in detail, and for this purpose reference will be had to the accompanying drawing in which the preferred embodiment of the invention has been illustrated and in which:

Fig. 1 is a top view of the power operated scraper which forms the subject of this invention;

Fig. 2 is a side elevation looking in the direction of arrow 2 in Fig. 1;

Fig. 3 is a section taken on line 3—3, Fig. 2;

Fig. 4 is a section taken on line 4—4, Fig. 2, and shows a latching mechanism for the endgate of the scraper;

Fig. 5 is a section taken on line 5—5, Fig. 4, and shows the endgate in open position; and Fig. 6 is a section taken on line 6—6, Fig. 1, and shows the manner in which the scraper frame is attached to the tractor.

In the drawing reference numeral 1 represents the side channel beams of a caterpillar tractor, and reference numeral 2, the endless tracks which encircle the drivewheels 3. The tractor is of the ordinary construction and has therefore been shown more or less diagrammatically so that only those parts that cooperate in a specific manner with the scraper mechanism have been illustrated in detail. The tractor is provided with an internal combustion engine 4 having a drive shaft 5. This drive shaft is journalled in a bearing 6 and is provided at its rear end with a gear wheel 7. Two parallel shafts 8 and 9 are journalled in bearings 10 and 11. Each of these shafts is provided with a gear wheel which meshes with the gear wheel 7, and is formed of two parts. The two parts of these shafts are connected by means of friction clutches 12 that can be independently controlled by means of handles 13. Located between the bearings 11 and 14 are drums 15, about which the cables, to which reference will hereinafter be made, are coiled during the operation of the scraper. The drums 15 are power operated winches which are employed for tilting the scraper in a manner that will hereinafter be more fully described. In the embodiment illustrated a scraper frame is attached to the tractor and this frame consists of two side members 16 which are usually constructed from channel irons and which are secured to beams 1 by means of bolts 17 and cross bars 18 in the manner shown in Fig. 6. Beams 16 extend forwardly beyond the front end of the tractor and have their forward ends provided with casters 19, which are adapted to come in contact with the ground to prevent the tractor from tipping forwardly if the scraper should be loaded with a greater weight than that for which the parts are designed. In order to employ a scraper of a greater width than the distance between the beam 16 these beams have been terminated at 20 and beams 21 have been attached to their front ends in the manner shown in Fig. 1. The front ends of beams 16 are connected by means of a transverse beam 22, Fig. 3, to the outer ends of which the beams 21 are secured. The rear ends of beams 21 are connected to beams 16 by means of bolts or rivets 23. With the construction just described, it is possible to employ a scraper of any width desired. Secured to the transverse beam 22 are upwardly extending guides 24, having elongated slots 25. A shaft 26 extends through the slots of the two guides 24. Links 27 have their rear ends connected with each of the ends of shaft 26 which forms a pivot about the axis of which the links may be rotated. Secured to the front ends of beams 21 are blocks 28 whose upper surfaces are formed by downwardly inclined sides 29 so as to produce a V-shaped notch in which the pivot pins 30 are supported. These pivot pins are secured to the sides 31 of the scraper. The scraper may be formed from a single steel plate having sides 31 and a bottom 32 and the front edge of the bottom may be provided with a cutting edge 33. The front ends of links 27 are provided with openings for the reception of the pivots 30. Links 27 are provided on their upper edges with upwardly extending lugs 34 that have notches for the reception of the ends of the rod 35, which serves as a pivot about which the endgate 36 can be rotated. Each link is also provided with a hook 37 that is pivoted at 38 and which is biased in one direction by the action of spring 39. A cable 40 is attached to the upper end of each hook and terminates at 41 where it can be readily grasped by the operator whenever he wants to release the hook 37. It will be seen from the drawing that the hook 37 is so positioned that it will engage over the rod 35 and will prevent the scraper from rotating with respect to the links. Whenever the scraper is to be rotated from the full line to the dotted line position shown in Fig. 2, the hook 37, must be released. Secured to each of the side beams 16 are two beams 42 and 43, which are both upwardly and forwardly inclined and have their upper ends connected so as to form with the beams 16 a triangle. The upper ends of these triangles are connected by means of a beam 44 to the upper surface of which two pairs of pulleys 45 are secured. Secured to each of the beams 42 is a bearing 46 in which the shaft 47 is journalled. The ends of this shaft are provided with crank arms 48 having crank pins 49. A connecting rod 50 extends from each crank pin to the shaft 26. A worm gear 51 is connected with the shaft 47 and a worm 52 is operatively associated with this gear. A rod 53 extends from the worm rearwardly and terminates in a crank 53ª. The rear end of this rod is journalled in a bearing 54. When rod 53 is rotated, it will rotate the shaft 47 and the crank arm 48, thereby raising and lowering the shaft 26 and the rear ends of the links 27 which are connected with this shaft. By adjusting the rear ends of the links vertically, the scraper is tilted about the axis of pivots 30 and can in this manner be adjusted so as to get the proper inclination for the best operation. Secured to the rear end of the scraper are two cables 55, one of which is attached near the bottom of the scraper to each of the sides 31. These cables pass upwardly over one pulley of each pair 45 and thence downwardly along the upper side of beams 43 to pulleys 56 and thence to the drum 15. Another pair of cables 57 are attached to the front ends of sides 31 and these cables pass over the other pulleys of the pairs 45 and thence downwardly to pulleys 58 and from thence to the other drum 15. It is evident that by operating one or the other of drums 15, either the rear or the front end of the scraper can be moved upwardly. When the drum controlling the cables 55 is rotated in one direction and the hooks 37 are released, the scraper will be tilted from the full line to the dotted line position shown in Fig. 2, without moving the links with respect to the frame. If the drum controlling cables 55 is operated, the front end of the scraper is raised together with the links 27 which rotate about the axis of shaft 26. When the front end of the scraper is raised, and the endgate 36 unlatched, the parts will assume the position shown in Fig. 5 from which it will be seen that the contents of the scraper will be discharged by a rearward movement and will pass from the scraper through the opening at the rear thereof. The endgate is provided with a latching mechanism which holds it in place except at such times as it is desired to dump the material. This latching mechanism may be of any suitable construction but has been illustrated as formed by two bolts 59 to which the levers 60 are attached. The outer ends of levers 60 are pivoted at 61 and their inner ends are connected with the cable 62. The bottom 32 of the scraper is provided with openings 63 through which the lower ends of bolts 59 project. When the bolts 59 are in the position shown in Fig. 4, the endgate is securedly held in closed position, but when the operator exerts a pull on the cable 62, these bolts are released with the result that the endgate is free to swing to the open position shown in Fig. 5.

When the scraper is to be filled with dirt, the parts are in the position shown in Fig. 2 and the tractor is operated to move the parts forwardly. After the scraper has been filled with dirt, one of the winches is operated so as to raise the front end of the scraper and to rotate it and the links about the axis of shaft 26. The load can now be transported to any place desired. If the load is to be dumped over an embankment, the scraper is lowered to the full line position shown in Fig. 2 after which tension is applied to cables 55 so as to tilt the scraper forwardly to the dotted line position, when the load will slide forwardly. If, on the other hand, it is desired to dump the scraper load on the surface in front of the tractor, the scraper is tilted to the position shown in Fig. 5 and the endgate released, whereupon the load will slide rearwardly in a manner quite apparent.

From the above description it will be apparent that I have produced a power operated scraper of a simple construction that can be easily operated and by means of which the dirt can be readily transported to any place desired and which is also constructed in such a manner that the dirt can be dumped over an embankment.

Having described the invention what is claimed as new is:

1. A power grader employing a tractor, horizontal beams secured to the sides of the tractor and projecting beyond the front end thereof, a scraper located between the front ends of the beams, a pair of links having their rear ends pivotally connected with the beams and their front ends pivotally connected with the sides of the scraper near the front of the latter, means for tilting the links and scraper about the former's pivotal connection with the beams without tilting the scraper relative to the links and means for tilting the scraper relative to the links while the latter remain stationary relative to the beams.

2. A power grader employing a tractor, a frame secured to the tractor, said frame comprising two beams, one located on each side of the tractor, a scraper located between the beams and in front of the tractor, a link pivotally connected with each side of the scraper adjacent the front end thereof, the rear ends of the links being pivotally connected with the frame at the rear of the scraper, means on the front ends of the beams for supporting the front ends of the links, cooperating means on the links and on the rear end of the scraper for supporting the latter, means attached to the scraper near its rear end for raising the latter without changing the position of the links, and means attached to the front end of the scraper for simultaneously rotating the scraper and links with respect to the beams.

3. A power grader employing a tractor, a frame secured to the tractor, said frame comprising two beams, one located on each side of the tractor, a scraper located between the beams and in front of the tractor, a link pivotally connected with each side of the scraper adjacent the front end thereof, the rear ends of the links being pivotally connected with the frame at the rear of the scraper, means on the front ends of the beams for supporting the front ends of the links, cooperating means on the links and on the rear end of the scraper for supporting the latter, means attached to the scraper near its rear end for raising the latter without changing the position of the links, means attached to the front end of the scraper for simultaneously rotating the scraper and links with respect to the beams and means for adjusting the vertical position of the pivotal connection between the links and the frame.

4. A power grader employing a tractor, a frame secured to the tractor, said frame comprising two beams, one located on each side of the tractor, a scraper located between the beams and in front of the tractor, a link pivotally connected with each side of the scraper adjacent the front end thereof, the rear ends of the links being pivotally connected with the frame at the rear of the scraper, means on the front ends of the beams for supporting the front ends of the links, cooperating means on the links and on the rear end of the scraper for supporting the latter, means attached to the scraper near its rear end for raising the latter without changing the position of the links and means attached to the front end of the scraper for simultaneously rotating the scraper and links with respect to the beams, means for adjusting the vertical position of the pivotal connection between the links and the frame, said means comprising a shaft mounted for rotation about a horizontal axis, transverse with respect to the frame, a crank arm and crank pin at each end of the shaft, a connecting rod extending from each crank pin to the rear end of the corresponding link and means comprising a worm gear for rotating the shaft.

5. A power grader employing a tractor, a frame secured to the tractor, said frame comprising four beams lying in the same horizontal plane, two beams being located on each side of the tractor, one outside of the other, the two outside beams projecting forwardly beyond the inner beams, a scraper located between the outermost beams and in front of the tractor, a link pivotally connected with each side of the scraper adjacent the front end thereof, the rear ends of the links being pivotally connected with the frame at the rear of the scraper, means on the front ends of the outermost beams for supporting the front ends of the links, cooperating means on the links and on the rear end of the scraper for supporting the latter, means attached to the scraper near its rear end for raising the latter without changing the position of the links, means attached to the front end of the scraper for simultaneously rotating the scraper and links with respect to the beams and a caster secured to the front end of each of the innermost side beams for supporting the latter.

6. A power grader employing a tractor, a frame secured to the tractor, said frame comprising four beams, lying in the same horizontal plane, two beams being located on each side of the tractor, one outside of the other, the two outside beams projecting forwardly beyond the inner beams, a scraper located between the outermost beams and in front of the tractor, a link pivotally connected with each side of the scraper adjacent the front end thereof, the rear ends of the links being pivotally connected with the frame at the rear of the scraper, means on the front ends of the outermost beams for supporting the front ends of the links, cooperating means on the links and on the rear end of the scraper for supporting the latter, means attached to the scraper near its rear end for raising the latter without changing the position of the links, means attached to the front end of the scraper for simultaneously rotating the scraper and links with respect to the beams, a caster secured to the front end of each of the innermost side beams for supporting the latter and means for adjusting the pivotal connection between the rear ends of the links and the frame in a vertical direction.

7. In a power grader having a tractor provided with two independently controllable winches, a frame comprising a horizontal beam secured to each side of the tractor, a bracket extending vertically from each beam, a shaft extending transversely of the frame and rotatably secured to the brackets, means comprising a worm gear for rotating the shaft, the ends of the shaft being each provided with a crank arm having a crank pin, a connecting rod secured to each crank pin, a scraper located between the forward ends of the beams, a link secured to each side of the scraper near the front end thereof, means for supporting the front end of each link, the rear end of each link being connected with the lower end of each connecting rod, means for holding the links against movement in the direction of their length, means for raising the rear end of the scraper without moving the links relative to the frame, and means for simultaneously rotating the scraper and the links relative to the frame without causing relative movement between the scraper and the links.

In testimony whereof I affix my signature.
HAROLD M. PURSEL.